(12) United States Patent
Shaffer (10) Patent No.: US 10,679,042 B2
(45) Date of Patent: Jun. 9, 2020

(54) METHOD AND APPARATUS TO ACCURATELY INTERPRET FACIAL EXPRESSIONS IN AMERICAN SIGN LANGUAGE

(71) Applicant: Irene Rogan Shaffer, Cambridge, MA (US)

(72) Inventor: Irene Rogan Shaffer, Cambridge, MA (US)

(*) Notice: Subject to any disclaimer, the term of this patent is extended or adjusted under 35 U.S.C. 154(b) by 53 days.

(21) Appl. No.: 16/154,957

(22) Filed: Oct. 9, 2018

(65) Prior Publication Data

US 2020/0110927 A1   Apr. 9, 2020

(51) Int. Cl.
*G06K 9/00* (2006.01)
*G09B 21/00* (2006.01)

(52) U.S. Cl.
CPC ..... *G06K 9/00315* (2013.01); *G06K 9/00228* (2013.01); *G06K 9/00355* (2013.01); *G09B 21/009* (2013.01)

(58) Field of Classification Search
CPC .......... G06K 9/00315; G06K 9/00228; G06K 9/00355; G09B 21/009
See application file for complete search history.

(56) References Cited

U.S. PATENT DOCUMENTS

| 6,477,239 | B1* | 11/2002 | Ohki | G09B 21/009 |
| | | | | 348/14.01 |
| 2017/0249009 | A1* | 8/2017 | Parshionikar | G06K 9/0053 |
| 2018/0075659 | A1* | 3/2018 | Browy | G06K 9/00671 |
| 2018/0364810 | A1* | 12/2018 | Parshionikar | G06F 3/017 |
| 2019/0340426 | A1* | 11/2019 | Rangarajan | G06K 9/00355 |

OTHER PUBLICATIONS

Susan M. Letourneau and Teresa V. Mitchell, "Gaze Patterns during Identity and Emotion Judgments in Hearing Adults and Deaf Users of American Sign Language", Article first published online: Jan. 1, 2011; Issue published: May 1, 2011, SAGE Journals, vol. 40, Issue 5, 2011, pp. 563-575.*

C. Fabian Benitez-Quiroz,Ronnie B. Wilbur,Aleix M. Martinez; "The not face: A grammaticalization of facial expressions of emotion"; May 2016; Publisher: Elsevier; Publication: Cognition; vol. 150, May 2016, pp. 77-84.*

* cited by examiner

*Primary Examiner* — Neil R McLean
(74) *Attorney, Agent, or Firm* — Rowan TELS LLC (57) ABSTRACT

A method and apparatus for accurately interpreting American Sign Language (ASL) including extracting facial features from a detected face and identifying an ASL user using these features. The linguistic markers are extracted and compared with linguistic markers stored in an ASL emotions database. An accurate emotion associated with the linguistic markers is received and displayed on a user interface.

14 Claims, 8 Drawing Sheets

METHOD AND APPARATUS TO ACCURATELY INTERPRET FACIAL EXPRESSIONS IN AMERICAN SIGN LANGUAGE

BACKGROUND

Facial expressions change the behavior of an observer interacting with the person, and if American Sign Language (ASL) linguistic facial expressions are misidentified as expressions of emotion, this could produce an unwanted response and lead to severe miscommunication. Currently, facial expression recognition technology is limited to identifying emotional expressions, and there is no broadly available tool for identifying ASL linguistic expressions.

Hearing observers, as well as facial expression recognition algorithms that are trained on hearing people, may not only fail to identify unfamiliar facial expressions, but will misinterpret ASL grammatical facial expressions as emotions. Therefore, there is a need for accurate recognition of ASL linguistic markers.

BRIEF SUMMARY

The methods of the disclosure provide steps involved in interpreting American Sign Language (ASL) including detecting a face of a person using an image capturing sensor; extracting facial features from the detected face using a facial feature extraction unit; sending the facial features to an ASL user ID unit, wherein the ASL user ID unit includes logic to identify an ASL user based on the facial features, the logic including, on condition the ASL user is identified, extracting potential facial linguistic markers; sending the linguistic markers to an ASL emotion ID unit; and on condition the ASL user is not identified: searching for a new face to detect; identifying an ASL emotion using the ASL emotion ID unit, wherein the ASL emotion ID unit includes logic to search an emotion associated with the linguistic marker by comparing the linguistic markers using an ASL emotions database, wherein ASL emotions database includes emotions associated with the linguistic markers, and configuring a user interface to display the ASL emotion associated with the linguistic marker.

The disclosure provides a face recognition system for interpreting American Sign Language, including an image capturing sensor configured to detect a face of a person; a facial feature extraction unit configured to extract facial features from the detected face and to send the facial features to an ASL user ID unit; an ASL user ID unit configured to receive facial features; identify an ASL user from the facial features using logical instructions; extract potential linguistic markers by comparing the linguistic markers stored in an ASL marker database; send the linguistic markers to an ASL emotion ID unit; and the ASL emotion ID unit configured to receive the linguistic markers, compare the received linguistic markers with the linguistic markers stored in ASL emotions database; find an emotion linked with the linguistic markers and display the emotion on a user interface.

The methods of the disclosure provide steps involved in tracking and capturing eye movements of an observer viewing an ASL user conveying an ASL message, visually capturing the ASL user's movements, wherein the eye movements are the ASL user's movements are captured simultaneously with the tracking and capturing of the eye movements of the observer, receiving a perceived ASL message from the observer, receiving an actual ASL message from the ASL user, comparing the perceived and actual ASL messages, determining linguistic markers from facial features using the recorded eye movements and the ASL message, classifying the linguistic markers and emotions from the ASL message, storing the linguistic markers and associated facial expressions in an ASL linguistic facial expression database or an emotional facial expression database.

This disclosure also provides an apparatus including a processor; and a memory storing instructions that, when executed by the processor, detects a face of a person using an image capturing sensor; extracts facial features from the detected face using a facial feature extraction unit; sends the facial features to an ASL user ID unit, wherein the ASL user ID unit includes logic to identify an ASL user based on the facial features, the logic including a condition when the ASL user is identified, to extract potential facial linguistic markers, send the linguistic markers to an ASL emotion ID unit, and a condition when the ASL user is not identified, to search for a new face to detect, identify an ASL emotion using the ASL emotion ID unit, wherein the ASL emotion ID unit includes logic to search an emotion associated with the linguistic marker by comparing the linguistic markers using an ASL emotions database, wherein ASL emotions database includes emotions associated with the linguistic markers, and configure an user interface to display the ASL emotion associated with the linguistic marker.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

"deaf" with a lowercase d, refers to the audiological status of deafness.

"Deaf" with an uppercase D, refers to membership in the Deaf community and use of a signed language.

"CODA" refers to Child of Deaf Adults, and indicates a cultural identity defined in part by shared experiences of growing up in a Deaf family. Many CODAs acquire signed and spoken languages from birth and are also referred to as hearing native signers.

"Emotional facial Expressions" refers to six emotional facial expressions: happy, sad, anger, surprise, disgust, and fear. These facial expressions have been shown to be universal expressions of emotion.

"ASL Linguistic facial Expressions" refers to the following linguistic facial expressions:
- MM—meaning effortlessly, regularly, or normal and proper.
- CS—meaning recently.
- TH—meaning carelessly or inattentively.
- INTENSE—meaning much greater than expected.
- PUFF—meaning a great deal or a large amount.
- PS—meaning smoothly, very thin, quickly, or easily.

This invention discusses a method and system for interpreting American Sign Language by including American Sign Language linguistic markers within facial expression recognition.

This invention provides a system to interpret ASL linguistic markers and thus, enable greater independence and empowerment for the Deaf community.

In addition to manual signs, facial and head movements have important linguistic roles in ASL and other sign languages, specifically in signaling different types of questions, such as yes-no (e.g., "Did you do that?"), wh- (who/what/where, e.g., "Why did you do that?"), and rhetorical (e.g., "Why did I do it? I don't know"). There are at least 20 adverbs or adjectives expressed by nonmanual movements, such as movements of the eyes, face, head, and torso.

Facial expressions used while signing can significantly alter the meaning or interpretation of a sentence. Some examples of linguistic facial expressions in ASL include raised eyebrows and a slight head tilt to indicate a conditional clause, or furrowed brows to indicate a wh- question. Adverbs can be expressed with distinct mouth configurations while signing a particular ASL verb.

Processing linguistic facial expressions requires specific attention to local facial features, such as the mouth or eyebrows, rather than the whole face. Emotional facial expressions are typically observed by global facial features, rather than local ones. Native ASL signers have higher proficiency than non-signers at identifying local facial features and their brains have been observed to process these facial expressions differently, perhaps due to extended experience with ASL linguistic expressions and with lip reading.

An automatic ASL interpreter must be able to accurately identify ASL facial expressions. Linguistic facial markers are significantly different in form and execution from the universally recognized emotional facial expressions: sad, happy, surprise, anger, fear, and disgust, and hearing subjects have been shown to have greater difficulty identifying linguistic facial expressions as compared to emotional facial expressions. Some hearing observers interpret ASL linguistic expressions as conveying affective or socially relevant information, while others treat the expressions as unfamiliar facial gestures, even though these expressions are different from emotional facial expressions.

For example, furrowed brows indicate anger to a hearing speaker, although in many cases this is simply part of a linguistic marker, such as a wh- question.

ASL linguistic markers, which are distinct from emotional expressions, are often misinterpreted as negative emotions by existing tools. Possible implications of this are the problems that may arise for the Deaf community with increasing surveillance and use of automated facial analysis tools.

A widely accessible technology for accurate interpreting may empower Deaf people to communicate freely and independently, (e.g., information from a doctor, access to a public lecture, the opportunity to ask a question in a classroom or state an opinion at a board meeting, etc.). Because facial expressions are such an important part of ASL, as described previously, any automatic ASL interpreter should be able to accurately identify ASL facial expressions.

Before an algorithm can identify an emotion on a face, it first needs to identify a face in the picture. This will be referred to as "face detection," which should not to be confused with "emotion detection."

Figure 1:
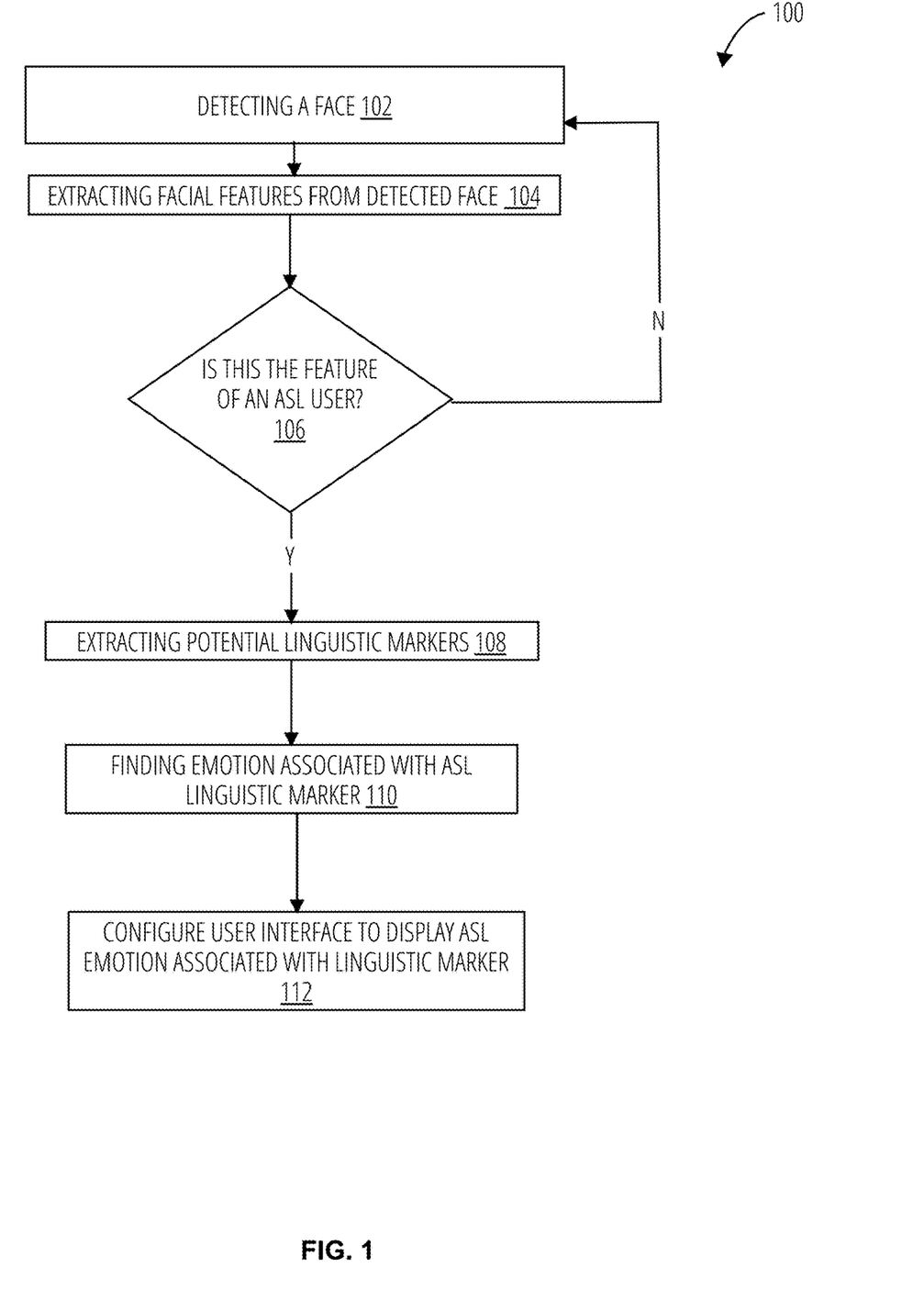
FIG. 1 illustrates a method 100 in accordance with one embodiment.

Referring to FIG. 1, a method 100 steps involved in accurately interpreting ASL facial expressions including detecting a face (block 102) and extracting facial features from the detected face (block 104). A decision is made to determine if the extracted facial features are from a feature of an ASL user (decision 106). If not, then the method 100 tries to detect another face. If an ASL user is detected, then the method 100 extracts potential linguistic markers (block 108) and finds an emotion associated with the ASL linguistic markers (block 110). The user interface is then configured to display the ASL emotion associated with the linguistic marker (block 112). When a face is detected, facial features are extracted. These facial features are compared using set of logical instructions to identify an ASL user. When an ASL user is identified, potential facial linguistic markers are extracted, emotions associated with ASL marker are searched and identified, and the enhanced ASL expression is conveyed. When the user is not an ASL user, a new face is detected, and the process is repeated.

The user interface is then configured to display the ASL emotion associated with the linguistic marker. When a face is detected, facial features are extracted. These facial features are compared using set of logical instructions to identify an ASL user. When an ASL user is identified, potential facial linguistic markers are extracted, emotions associated with ASL marker are searched and identified, and the enhanced ASL expression is conveyed. When the user is not an ASL user, a new face is detected, and the process is repeated.

Examples of linguistic markers include facial expressions or gestures that mean effortlessly, regularly, normal and proper, recently, carelessly, inattentively, much greater than expected, a great deal, a large amount, smoothly, very thin, quickly, easily, etc.

Figure 2:
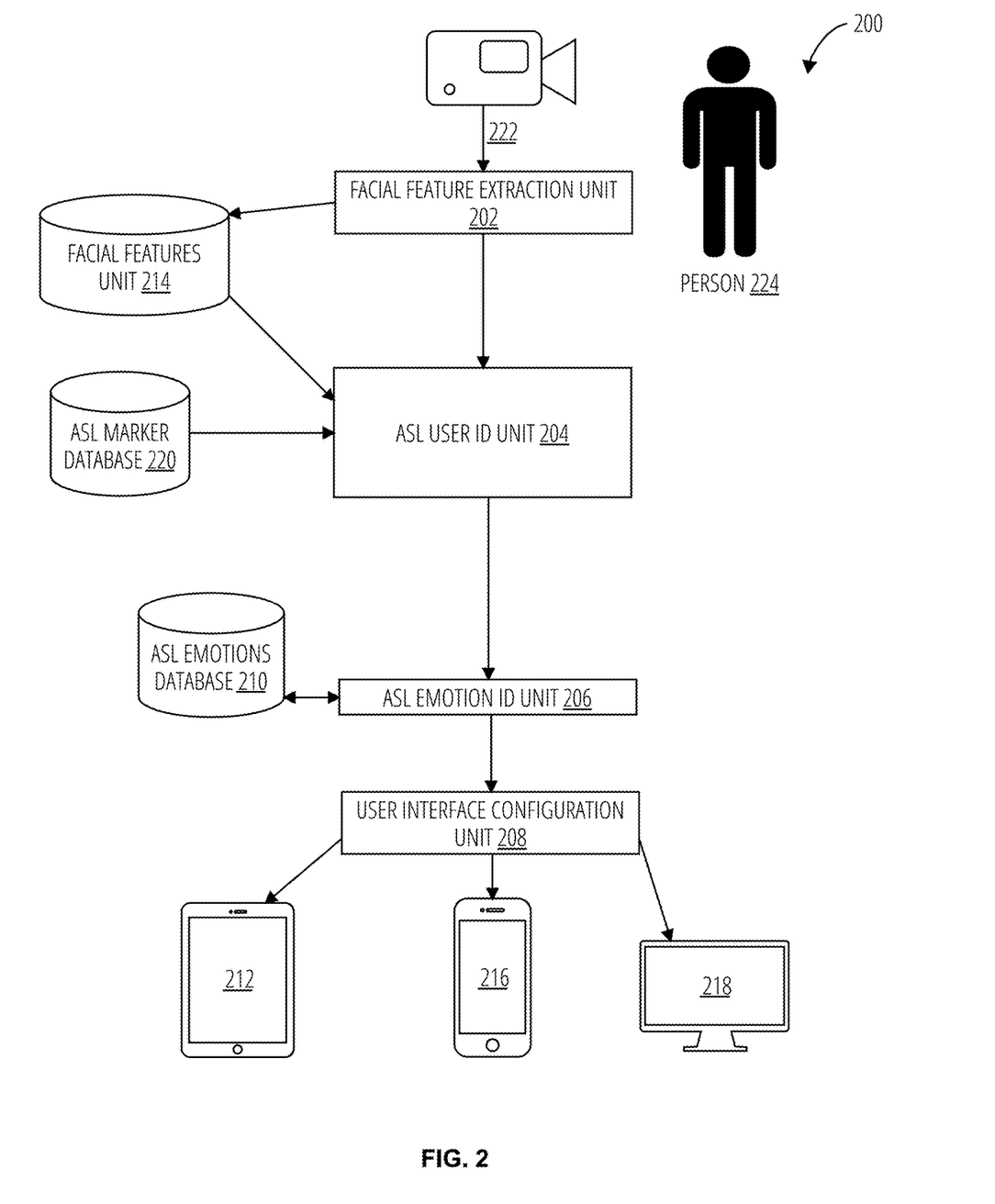
FIG. 2 illustrates a system 200 in accordance with one embodiment.

Referring to FIG. 2, a block diagram of a system 200 for accurately interpreting ASL facial expressions is shown. An image capturing sensor 222 detects the face of a person 224 and a facial feature extraction unit 202 extracts facial features. The facial feature extraction unit 202 includes logic to identify local facial features and global facial features. These extracted facial features are sent to a facial features unit 214, which stores the particular facial features for the face of the person 224. The ASL user ID unit 204, accesses the facial features from the facial features unit 214, executes logical instructions to assess the facial features by comparing them to an ASL marker database 220, and identifies whether the features are those of an ASL user.

If the facial features are those of an ASL user, then the ASL user ID unit 204 extracts potential linguistic markers and sends the markers to the ASL emotion ID unit 206.

The ASL emotion ID unit 206 includes logic to identify the ASL emotion associated with the extracted linguistic markers by comparing the extracted linguistic markers to curated linguistic markers in an ASL emotions database. The ASL emotions database 210 includes emotions associated with the curated linguistic markers.

Examples of an image capturing sensor 222 includes a camera, a smartphone, a tablet, and the like. The facial feature extraction unit 202 may include a laptop, a computer, a tablet, a server, access to a cloud server, and the like.

The ASL user ID unit 204 may include one or more processor (s) and volatile and non-volatile memory that stores instructions to identify an ASL user, extract linguistic markers and send these markers to the ASL emotion ID unit 206. The ASL user ID unit 204 may be located on a cloud server.

The ASL emotion ID unit 206 may include one or more processor (s) and volatile and non-volatile memory that stores instructions to compare linguistic markers and emotions and send the accurate emotions to user interface configuration unit 208. The ASL emotion ID unit 206 may be located on a cloud server.

A user interface may include devices like a smartphone 216, a hand held device 212, a computer 218, and the like.

Figure 3:
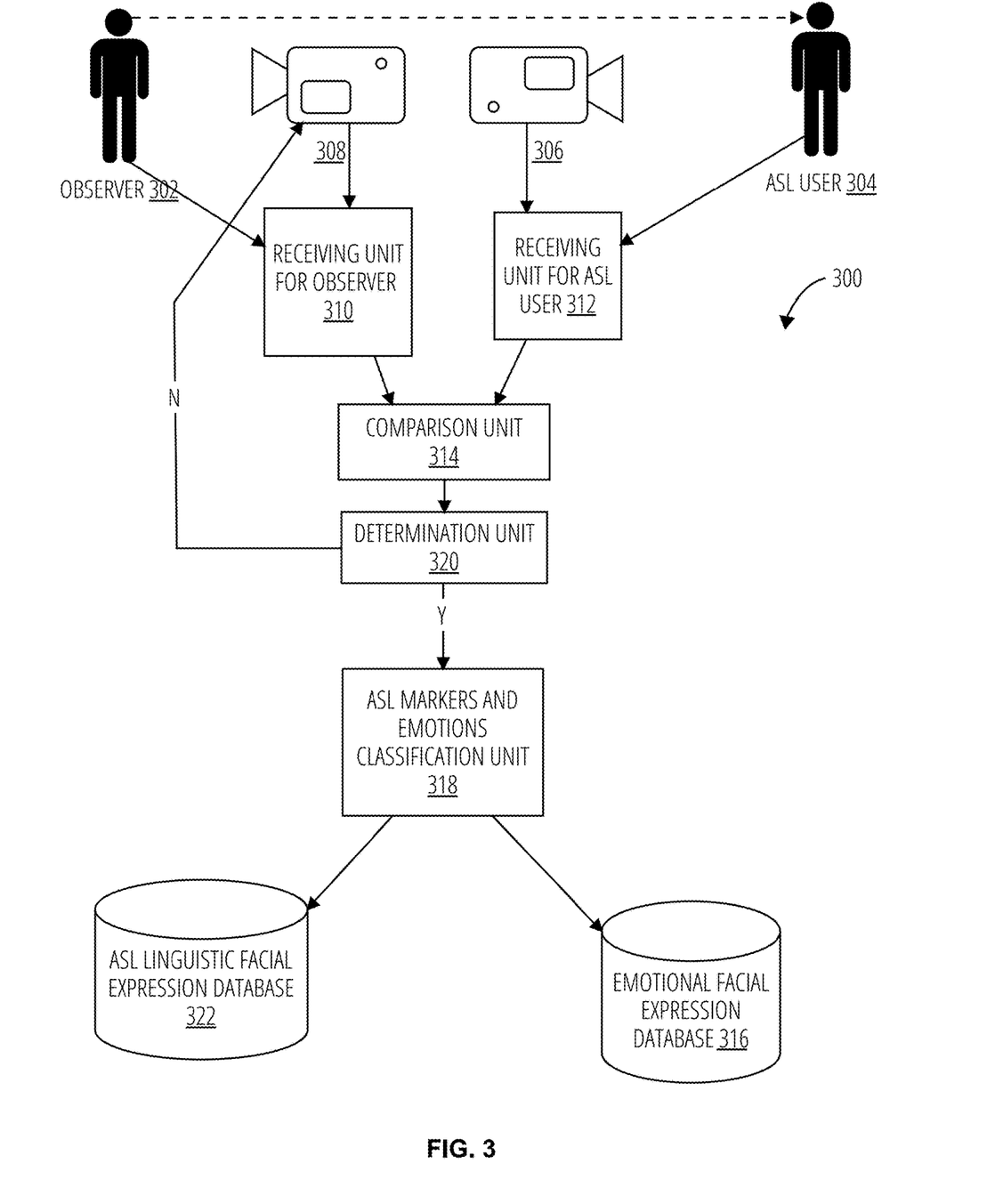
FIG. 3 illustrates a system 300 in accordance with one embodiment.

Referring to FIG. 3, system 300 is shown as a block diagram for creating an ASL linguistic facial expression database 322 and an emotional facial expression database 316. The system 300 comprises an observer 302, an ASL user 304, an image capturing sensor 306, an image capturing sensor 308, a receiving unit for observer 310, a receiving unit for ASL user 312, a comparison unit 314, an ASL linguistic facial expression database 322, an emotional facial expression database 316, an ASL markers and emotions classifications unit 318, and a determination unit 320.

In an embodiment, image capturing sensor 306 and image capturing sensor 308 may be a camera, a smartphone, and may be used to simultaneously track and record an observer 302 looking at an ASL user 304 communicating an ASL message. The eye movements are the ASL user's movements that are captured simultaneously with the tracking and capturing of the eye movements of the observer 302.

The observer 302 conveys the perceived ASL message to the receiving unit for observer 310 and the ASL user conveys the actual ASL message to the receiving unit for ASL user 312. The observer 302 may be a Deaf adult or a CODA. The perceived ASL message represents the observer's interpretation of the viewed ASL message. The actual ASL message represents the ASL message the ASL user intended to convey.

The comparison unit 314 compares the perceived ASL message from the observer with the actual ASL message from the ASL user. If the perceived ASL message is the same as the actual ASL message, then the ASL message is sent to the determination unit 320. If the perceived ASL message received by the observer is not same as the actual ASL message of the ASL user, then it alerts both users to repeat the eye movement tracking and recording process.

The determination unit 320 determines the linguistic markers from facial features on the ASL user that are associated with the eye movements of the observer while viewing the ASL message and sends it to the ASL markers and emotions classifications unit 318.

ASL markers and emotions classifications unit 318 classifies the linguistic markers based on the actual ASL message. If the linguistic markers are classified as an emotional facial expression, then the ASL markers and emotions classifications unit 318 links the linguistic markers to the emotional facial expression and stores the linked linguistic markers and associated emotional facial expression in an emotional facial expression database 316.

If the linguistic markers are classified as an ASL linguistic facial expression, then the ASL markers and emotions classifications unit 318 links the linguistic markers to the ASL linguistic facial expression and stores the linked linguistic markers and associated ASL linguistic facial expression in an ASL linguistic facial expression database 322.

The receiving unit for observer 310 may include one or more processor (s) and volatile and non-volatile memory that stores the ASL message from the observer. The receiving unit for ASL user 312 may include one or more processor (s) and volatile and non-volatile memory that stores the ASL message of the ASL user.

The comparison unit 314 may include one or more processor (s) and volatile and non-volatile memory that stores logical instructions to compare the ASL message from the observer 302 with the ASL message from the ASL user 304. The determination unit 320 may include one or more processor (s) and volatile and non-volatile memory that stores a set of decision making instructions to determine the linguistic markers from the ASL message.

The ASL markers and emotions classifications unit 318 may include one or more processor (s) and volatile and non-volatile memory that stores executable instructions to divide the ASL message into ASL linguistic facial expressions or emotional facial expressions.

Examples of the ASL linguistic facial expression database 322 and the emotional facial expression database 316 may include a storage unit such as a memory, cloud storage, computers, servers and the like.

Figure 4:
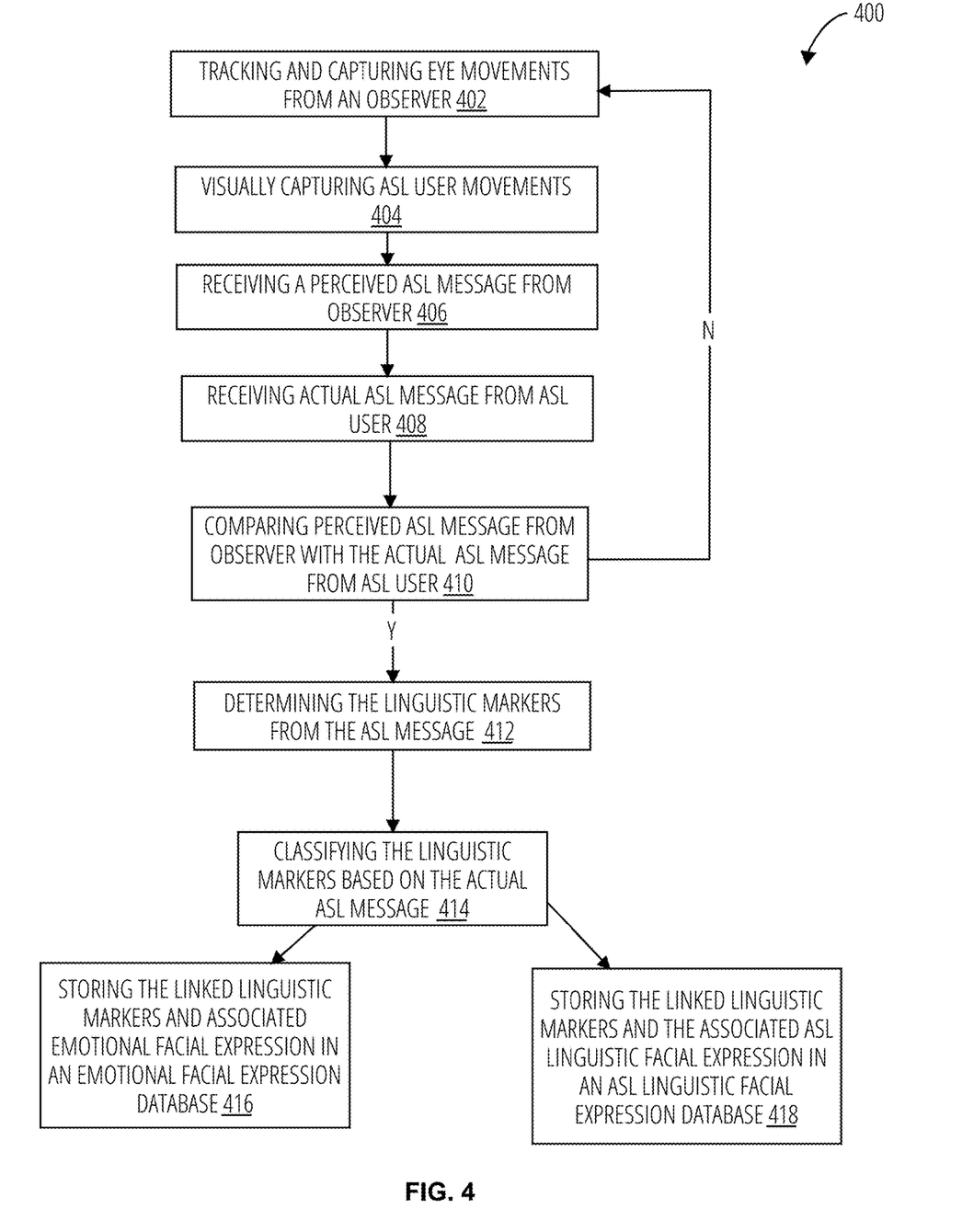
FIG. 4 illustrates a method 400 in accordance with one embodiment.

Referring to FIG. 4, method 400 is an example of the steps involved in creating and storing ASL linguistic markers and emotions linked to these markers. The steps include tracking and capturing eye movements from an observer (block 402), capturing the ASL user movements (block 404), receiving a perceived ASL message from the observer (block 406), receiving an actual ASL message from the ASL user (block 408) and comparing the perceived ASL message with the actual ASL message (block 410).

If the ASL message is the same, the linguistic markers on the ASL user that are associated with the eye movements of the observer while viewing the ASL message are determined (block 412). If the ASL message is different, then the observer and the ASL user are alerted and instructed to begin the eye movement tracking and recording procedure again.

Upon determining the linguistic markers, the linguistic markers are classified based on the actual ASL message (block 414).

If the linguistic markers are classified as an emotional facial expression, then it links the linguistic markers to the emotional facial expression and stores the linked linguistic markers and associated emotional facial expression in an emotional facial expression database (block 416).

If the linguistic markers are classified as an ASL linguistic facial expression, then it links the linguistic markers to the ASL linguistic facial expression and stores the linked linguistic markers and the associated ASL linguistic facial expression in an ASL linguistic facial expression database (block 418).

Figure 5:
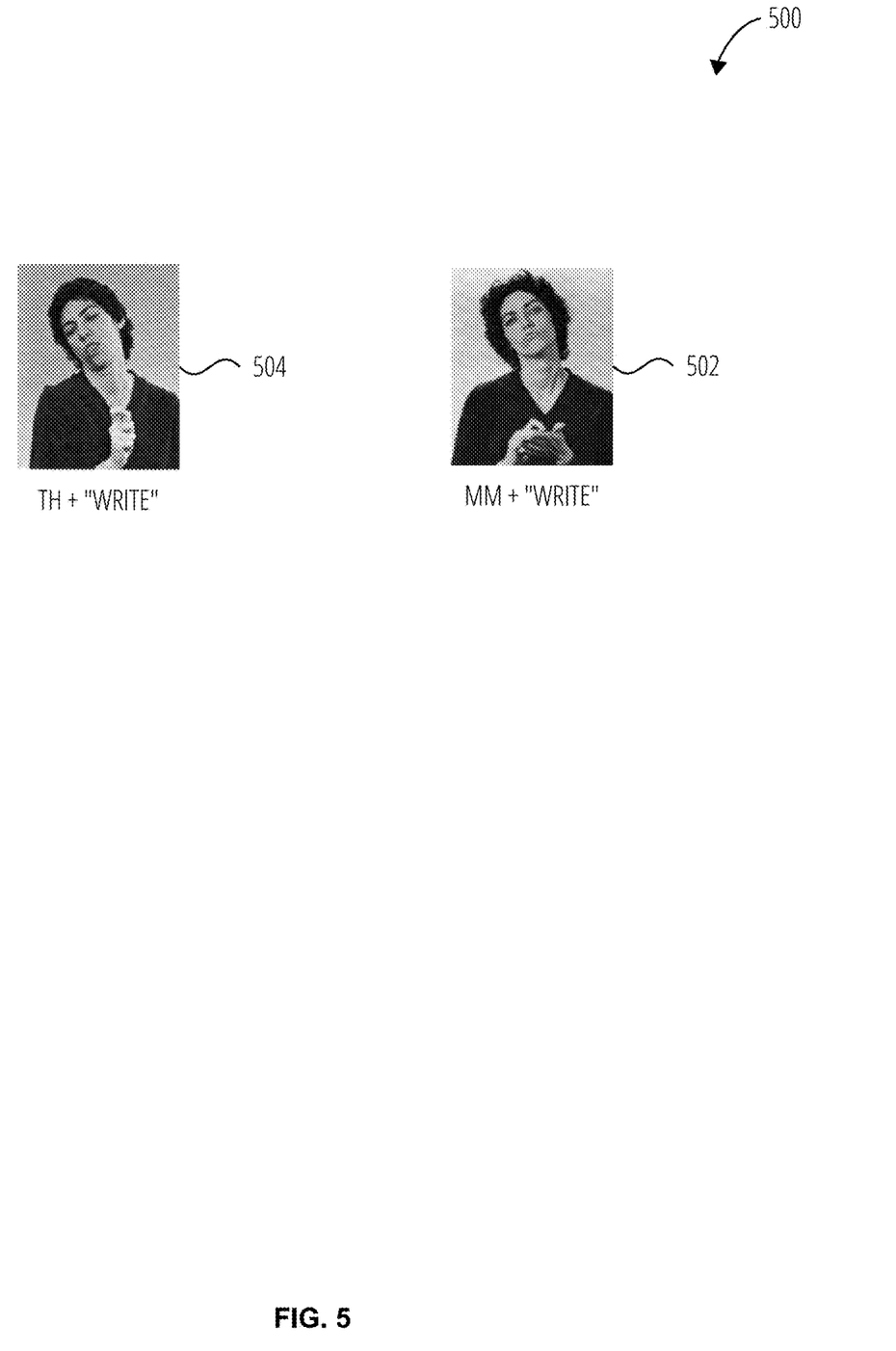
FIG. 5 illustrates an example 500 in accordance with one embodiment.

Referring to FIG. 5, example 500 shows nonmanual adverbs TH+"write" 504 and MM+"write" 502, which are used with the ASL sign "write."

The TH expression indicates "write carelessly," while the same sign made with the MM expression made along with the sign for "write" indicates "write at a regular pace."

Figure 6:
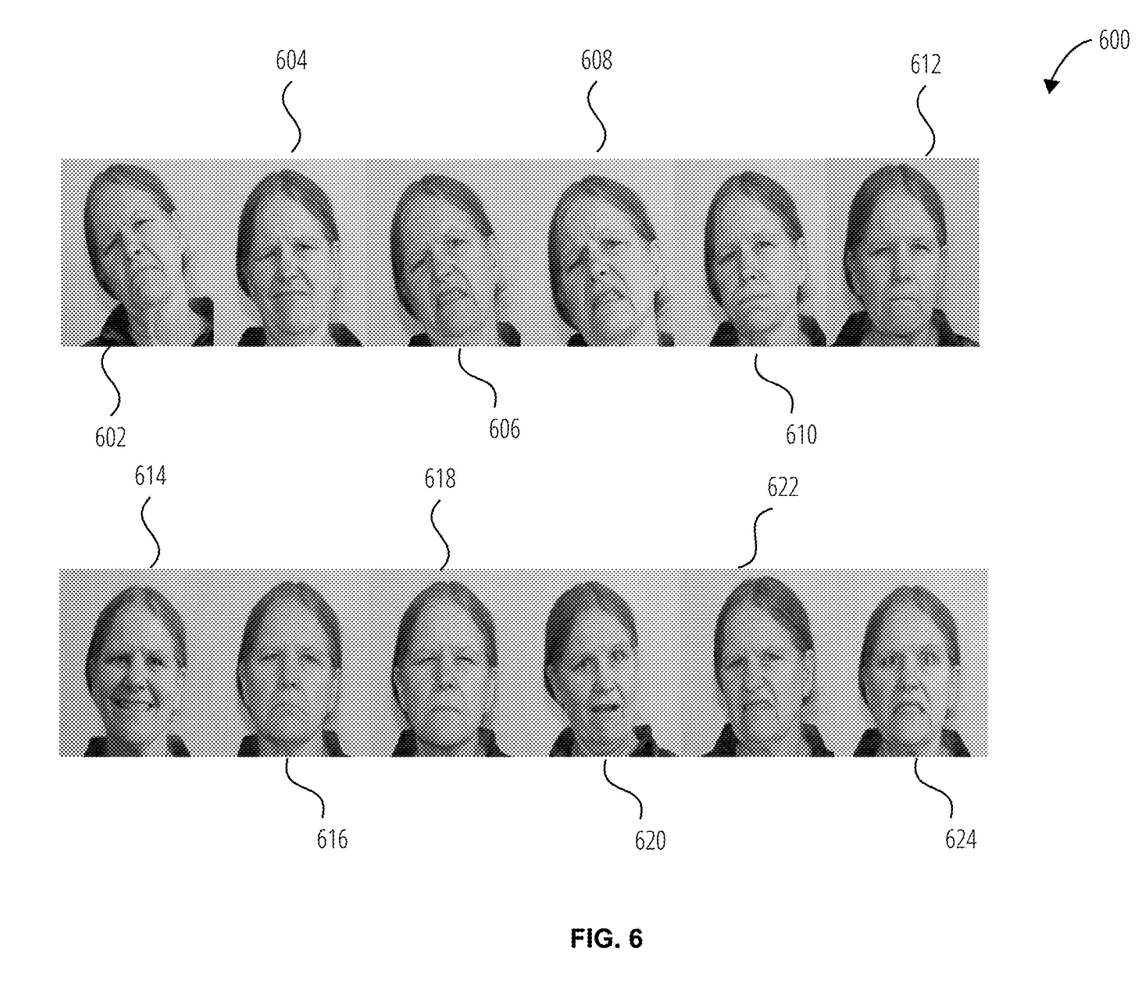
FIG. 6 illustrates an example 600 in accordance with one embodiment.

Referring to FIG. 6, example 600 shows linguistic markers such as MM 602, CS 604, TH 606, INTENSE 608, PUFF 610 and PS 612. Emotional facial expressions such as Happy 614, Sad 616, Anger 618, Surprise 620, Disgust 622 and Fear 624 are also shown.

This example 600 shows local facial features and global facial features. Examples of facial features include local facial features including a mouth, eyebrows, eyes, raised eyebrows, a slight head tilt, a furrowed brow, and the like.

Examples of facial features may also include global facial features like a sad expression, a happy expression, an angry expression, and so on.

Figure 7:
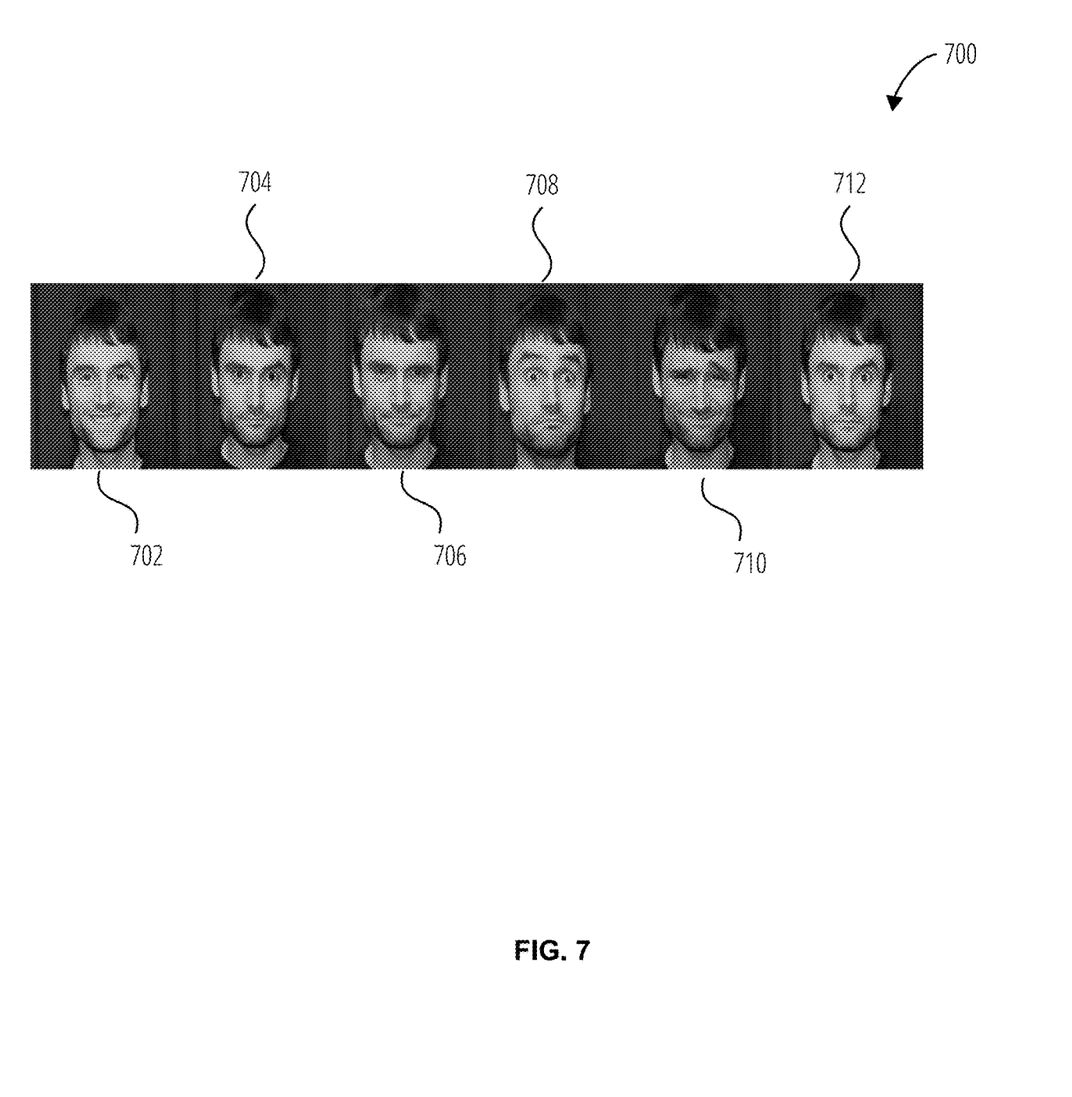
FIG. 7 illustrates an example 700 in accordance with one embodiment.

Referring to FIG. 7, example 700 shows photos of emotional facial expressions captured from hearing subjects, which include Happy 702, Sad 704, Anger 706, Surprise 708, Disgust 710 and Fear 712.

Figure 8:
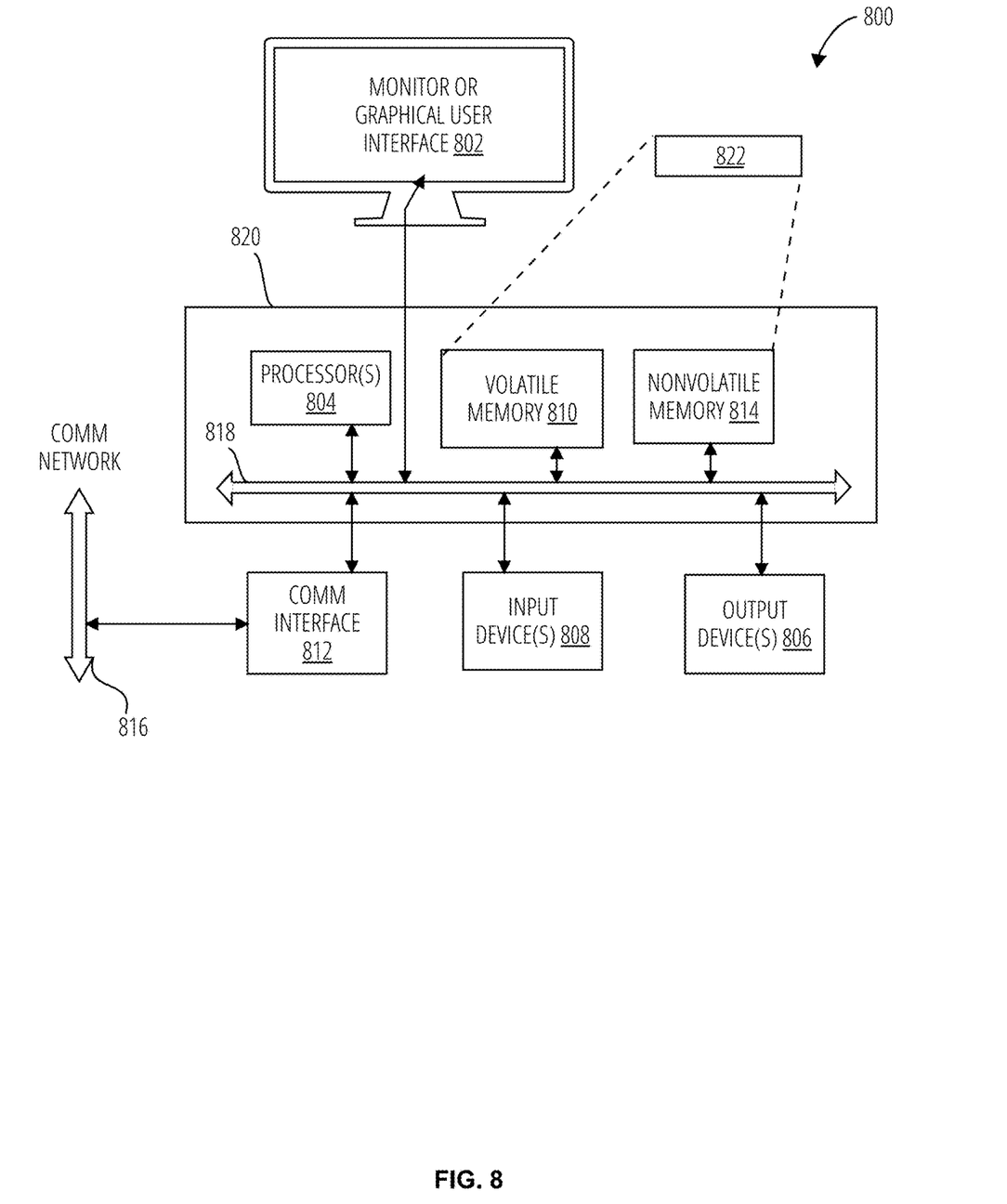
FIG. 8 is an example block diagram of a computing device 800 that may incorporate embodiments of the present invention.

FIG. 8 is an example block diagram of a computing device 800 that may incorporate embodiments of the present invention. FIG. 8 is merely illustrative of a machine system to carry out aspects of the technical processes described herein, and does not limit the scope of the claims. One of ordinary skill in the art would recognize other variations, modifications, and alternatives. In one embodiment, the computing device 800 typically includes a monitor or graphical user interface 802, a data processing system 820, a communication network interface 812, input device(s) 808, output device(s) 806, and the like.

As depicted in FIG. 8, the data processing system 820 may include one or more processor(s) 804 that communicate with a number of peripheral devices via a bus subsystem 818. These peripheral devices may include input device(s) 808, output device(s) 806, communication network interface 812, and a storage subsystem, such as a volatile memory 810 and a nonvolatile memory 814.

The volatile memory 810 and/or the nonvolatile memory 814 may store computer-executable instructions and thus forming logic 822 that when applied to and executed by the processor(s) 804 implement embodiments of the processes disclosed herein.

The input device(s) 808 include devices and mechanisms for inputting information to the data processing system 820. These may include a keyboard, a keypad, a touch screen incorporated into the monitor or graphical user interface 802, audio input devices such as voice recognition systems, microphones, and other types of input devices. In various embodiments, the input device(s) 808 may be embodied as a computer mouse, a trackball, a track pad, a joystick, wireless remote, drawing tablet, voice command system, eye tracking system, and the like. The input device(s) 808 typically allow a user to select objects, icons, control areas, text and the like that appear on the monitor or graphical user interface 802 via a command such as a click of a button or the like.

The output device(s) 806 include devices and mechanisms for outputting information from the data processing system 820. These may include the monitor or graphical user interface 802, speakers, printers, infrared LEDs, and so on as well understood in the art.

The communication network interface 812 provides an interface to communication networks (e.g., communication network 816) and devices external to the data processing system 820. The communication network interface 812 may serve as an interface for receiving data from and transmitting data to other systems. Embodiments of the communication network interface 812 may include an Ethernet interface, a modem (telephone, satellite, cable, ISDN), (asynchronous) digital subscriber line (DSL), FireWire, USB, a wireless communication interface such as Bluetooth or WiFi, a near field communication wireless interface, a cellular interface, and the like.

The communication network interface 812 may be coupled to the communication network 816 via an antenna, a cable, or the like. In some embodiments, the communication network interface 812 may be physically integrated on a circuit board of the data processing system 820, or in some cases may be implemented in software or firmware, such as "soft modems", or the like.

The computing device 800 may include logic that enables communications over a network using protocols such as HTTP, TCP/IP, RTP/RTSP, IPX, UDP and the like.

The volatile memory 810 and the nonvolatile memory 814 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 810 and the nonvolatile memory 814 may be configured to store the basic programming and data constructs that provide the functionality of the disclosed processes and other embodiments thereof that fall within the scope of the present invention.

Logic 822 that implements embodiments of the present invention may be stored in the volatile memory 810 and/or the nonvolatile memory 814. Said logic 822 may be read from the volatile memory 810 and/or nonvolatile memory 814 and executed by the processor(s) 804. The volatile memory 810 and the nonvolatile memory 814 may also provide a repository for storing data used by the logic 822.

The volatile memory 810 and the nonvolatile memory 814 may include a number of memories including a main random access memory (RAM) for storage of instructions and data during program execution and a read only memory (ROM) in which read-only non-transitory instructions are stored. The volatile memory 810 and the nonvolatile memory 814 may include a file storage subsystem providing persistent (non-volatile) storage for program and data files. The volatile memory 810 and the nonvolatile memory 814 may include removable storage systems, such as removable flash memory.

The bus subsystem 818 provides a mechanism for enabling the various components and subsystems of data processing system 820 communicate with each other as intended. Although the communication network interface 812 is depicted schematically as a single bus, some embodiments of the bus subsystem 818 may utilize multiple distinct busses.

It will be readily apparent to one of ordinary skill in the art that the computing device 800 may be a device such as a smartphone, a desktop computer, a laptop computer, a rack-mounted computer system, a computer server, or a tablet computer device. As commonly known in the art, the computing device 800 may be implemented as a collection of multiple networked computing devices. Further, the computing device 800 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Examples and Studies

Table 1 (Prior Art) shows the overall face detection rates, averaged across all six services such as such as Affectiva™, Azure™, EmoVu™, face++™, Kairos™ and Sightcorp™. They are clearly highest for hearing subjects (97%), slightly lower for Children Of Deaf Adults (CODA) subjects (89%), and lowest for Deaf subjects (75%). This ordering is true for nearly all of the services, except for the Azure™ service, which had face detection rates above 98% for all three subject types.

TABLE 1

Percentage of photos in which faces were detected, averaged across all six services.

| Subject Type | Percentage of photos with face detected |
| --- | --- |
| CODA (out of 300) | 89% |
| Deaf (out of 300) | 75% |
| Hearing (out of 150) | 97% |

The face detection rates are broken down by emotion and ASL linguistic marker in Table 2. The photos with the ASL linguistic marker expressions were much less likely to have a face detected in the image. MM was the worst, with only a 66% face detection rate in these photos. All six of the linguistic markers had lower overall face detection rates (which ranged from 66% to 87%) than any of the six emotion expressions (which ranged from 88% to 91%).

TABLE 2

Number of photos for each emotion and ASL linguistic marker in which faces were detected.

| | | Affectiva | Azure | EmoVu | Face++ | Kairos | Sightcorp | Overall % |
| --- | --- | --- | --- | --- | --- | --- | --- | --- |
| Emotions (out of 75) | anger | 51 | 75 | 66 | 70 | 70 | 74 | 90.2% |
| | disgust | 43 | 75 | 68 | 75 | 68 | 74 | 89.6% |
| | fear | 54 | 75 | 62 | 75 | 68 | 75 | 90.9% |
| | happy | 55 | 75 | 65 | 75 | 68 | 73 | 91.3% |
| | sad | 54 | 75 | 62 | 69 | 64 | 74 | 88.4% |
| | surprise | 52 | 75 | 61 | 73 | 68 | 75 | 89.8% |
| ASL Linguistic Markers (out of 50) | CS | 26 | 49 | 33 | 50 | 32 | 46 | 78.7% |
| | INTENSE | 24 | 50 | 35 | 50 | 34 | 44 | 79.0% |
| | MM | 17 | 46 | 19 | 50 | 21 | 44 | 65.7% |
| | PS | 32 | 46 | 42 | 45 | 46 | 50 | 87.0% |
| | PUFF | 25 | 50 | 29 | 45 | 37 | 47 | 77.7% |
| | TH | 19 | 50 | 30 | 45 | 31 | 47 | 74.0% |

Overall emotion recognition rates are summarized in Table 3 and are broken down by each emotion in Table 4. Deaf subjects consistently had the highest emotion detection rates across the majority of the services tested. CODA subjects had a comparable detection rate overall, though slightly lower. Hearing subjects had an emotion detection rate that was on average more than 10% worse than the Deaf subjects.

One clear trend is that "happy" is well-recognized across all subject types by nearly all of the services tested; however, all of the other emotions had widely varying detection rates across both services and subject types. The most significant split seems to be between the hearing subjects and the Deaf/CODA subjects. In particular, images of "anger", "disgust", and "sad" tended to have much higher detection accuracy for Deaf and CODA subjects than for hearing subjects.

TABLE 3

Overall successful emotion recognition rates for each of the six services.

|  | Affectiva | Azure | EmoVu | Face++ | Kairos | Sightcorp | Average |
|---|---|---|---|---|---|---|---|
| CODA | 38.1% | 44.0% | 52.1% | 44.3% | 40.3% | 33.3% | 42.0% |
| Deaf | 50.0% | 46.7% | 57.6% | 52.2% | 29.6% | 30.3% | 44.4% |
| Hearing | 39.2% | 22.0% | 34.0% | 25.3% | 50.6% | 32.0% | 33.9% |
| Overall | 41.7% | 37.6% | 46.4% | 40.3% | 40.1% | 31.9% | 39.7% |

TABLE 4

Detailed emotion recognition confusion matrix results for each of the six services.

|  |  | Affectiva | | Azure | | EmoVu | | Face++ | | Kairos | | Sightcorp | |
|---|---|---|---|---|---|---|---|---|---|---|---|---|---|
|  |  | P | R | P | R | P | R | P | R | P | R | P | R |
| CODA | anger | 38% | 32% | 61% | 44% | 41% | 72% | 47% | 28% | 64% | 50% | 26% | 32% |
|  | disgust | 18% | 31% | 100% | 44% | 78% | 28% | 61% | 56% | 29% | 20% | 86% | 24% |
|  | fear | 75% | 33% | n/a | 0% | 44% | 44% | 56% | 20% | 29% | 64% | 19% | 16% |
|  | happy | 50% | 81% | 37% | 100% | 61% | 96% | 40% | 100% | 55% | 71% | 48% | 100% |
|  | sad | 44% | 27% | 36% | 60% | 53% | 50% | 39% | 38% | 0% | 0% | 14% | 16% |
|  | surprise | 20% | 13% | 33% | 16% | 71% | 22% | 35% | 24% | 33% | 7% | 30% | 12% |
| Deaf | anger | 50% | 62% | 29% | 24% | 57% | 100% | 70% | 35% | 50% | 21% | 20% | 50% |
|  | disgust | 23% | 58% | 100% | 24% | 54% | 72% | 47% | 60% | 32% | 43% | 46% | 46% |
|  | fear | 100% | 17% | n/a | 0% | 47% | 58% | 60% | 48% | 18% | 62% | 18% | 12% |
|  | happy | 83% | 77% | 47% | 100% | 68% | 81% | 44% | 80% | n/a | 0% | 40% | 52% |
|  | sad | 64% | 47% | 45% | 88% | 67% | 24% | 54% | 65% | 70% | 50% | 43% | 25% |
|  | surprise | 60% | 40% | 52% | 44% | n/a | 0% | 71% | 22% | 0% | 0% | n/a | 0% |
| Hearing | anger | 33% | 21% | 0% | 0% | 29% | 52% | n/a | 0% | 30% | 70% | 20% | 32% |
|  | disgust | 17% | 20% | 0% | 0% | 50% | 20% | 67% | 16% | 75% | 30% | 24% | 24% |
|  | fear | 48% | 42% | n/a | 0% | 46% | 40% | 0% | 0% | 36% | 64% | 17% | 4% |
|  | happy | 48% | 100% | 23% | 100% | 39% | 80% | 25% | 100% | 76% | 84% | 47% | 96% |
|  | sad | 50% | 15% | 33% | 12% | 40% | 8% | 0% | 0% | 50% | 14% | 44% | 28% |
|  | surprise | 32% | 29% | 19% | 20% | 6% | 4% | 23% | 36% | 100% | 21% | 18% | 8% |
| Total | anger | 41% | 35% | 42% | 23% | 40% | 71% | 56% | 20% | 43% | 45% | 21% | 38% |
|  | disgust | 20% | 35% | 94% | 23% | 58% | 37% | 54% | 44% | 37% | 32% | 41% | 31% |
|  | fear | 58% | 33% | n/a | 0% | 45% | 45% | 57% | 23% | 26% | 63% | 18% | 11% |
|  | happy | 53% | 87% | 33% | 100% | 51% | 86% | 34% | 93% | 65% | 58% | 46% | 84% |
|  | sad | 55% | 30% | 40% | 53% | 53% | 26% | 42% | 32% | 53% | 29% | 29% | 23% |
|  | surprise | 36% | 27% | 33% | 27% | 26% | 10% | 32% | 27% | 63% | 10% | 24% | 7% |

P = Precision,
R = Recall

Table 5 shows the results across all services of the ASL linguistic marker recognition as emotions. There are very clear trends for how several of the ASL linguistic markers are recognized by the emotion recognition APIs:

CS: For both CODAs and Deaf subjects, CS tends to be identified as "happy", "anger", "disgust", or "sad", all at comparable rates.

INTENSE: Identification of INTENSE significantly varies between CODAs and Deaf subjects. It is most often identified as "happy" for Deaf subjects, and "fear" for CODA subjects.

MM: This expression is typically identified as "happy", "sad", or "anger" for both CODAs and Deaf subjects.

PS: For both CODAs and Deaf subjects, the PS expression is usually identified as "anger" or "disgust".

PUFF: This expression is mostly recognized as "anger" or "sad" for both CODAs and Deaf subjects.

TH: The TH linguistic marker is frequently identified as "disgust" or "anger" for CODA subjects, and as "disgust" or "happy" for Deaf subjects.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method for interpreting American Sign Language (ASL), comprising:
   detecting a face of a person using an image capturing sensor;

extracting facial features from the detected face using a facial feature extraction unit, wherein the facial feature extraction unit includes logic to identify local facial features and global facial features;

sending the extracted facial features to an ASL user ID unit, wherein the ASL user ID unit includes logic to identify an ASL user based on the facial features, the logic including:

on condition the ASL user is identified:
extracting linguistic markers from the extracted facial features; and
sending the extracted linguistic markers to an ASL emotion ID unit,
and
on condition the ASL user is not identified:
searching for a new face to detect;
identifying an ASL emotion using the ASL emotion ID unit, wherein the ASL emotion ID unit includes logic to identify the ASL emotion associated with the extracted linguistic markers by comparing the extracted linguistic markers to curated linguistic markers in an ASL emotions database, wherein the ASL emotions database includes emotions associated with the curated linguistic markers,
and
configuring a user interface to display the ASL emotion associated with the extracted linguistic markers.

2. The method of claim 1, wherein the facial features include at least one of local facial features, global facial features, and combinations thereof.

3. The method of claim 2, wherein the local facial features include at least one of a mouth, eyebrows, an eye, eyes, raised eyebrows, a slight head tilt, a furrowed brow, and combinations thereof.

4. The method of claim 2, wherein the global facial features include at least one of a sad expression, a happy expression, an angry expression, and combinations thereof.

5. The method of claim 1, wherein the linguistic markers include at least one of effortlessly, regularly, normal and proper, recently, carelessly, inattentively, much greater than expected, a great deal, a large amount, smoothly, very thin, quickly, easily, and combinations thereof.

6. A method comprising:
tracking and capturing eye movements of an observer viewing an American Sign Language (ASL) user conveying an ASL message;
visually capturing the movements of the ASL user; wherein the eye movements of the observer and the movements of the ASL user are captured simultaneously with the tracking and capturing of the eye movements of the observer;
receiving a perceived ASL message from the observer, wherein the perceived ASL message represents the observer's interpretation of the viewed ASL message;
receiving an actual ASL message from the ASL user, wherein the actual ASL message represents the ASL message the ASL user intended to convey;
comparing the perceived ASL message from the observer with the actual ASL message from the ASL user, wherein:
on condition that the perceived ASL message is the same as the actual ASL message:
determining linguistic markers from facial features on the ASL user that are associated with the eye movements of the observer while using the ASL message;
and
on condition that the perceived ASL message is not the same as that actual ASL message:
repeating the method from the tracking and capturing eye movements step;
and
classifying the linguistic markers based on the actual ASL message, wherein:
on condition that the linguistic markers are classified as an emotional facial expression:
linking the linguistic markers to the emotional facial expression;
and storing the linked linguistic markers and associated emotional facial expression in an emotional facial expression database;
and
on condition that the linguistic markers are classified as an ASL linguistic facial expression:
linking the linguistic markers to the ASL linguistic facial expression; and
storing the linked linguistic markers and associated ASL linguistic facial expression in an ASL linguistic facial expression database.

7. The method of claim 6, wherein the facial features include at least one of local facial features, global facial features, and combinations thereof.

8. The method of claim 6, wherein the observer includes at least one of a Deaf adult, a child of a Deaf adult, and combinations thereof.

9. A computing apparatus, the computing apparatus comprising:
a processor; and
a memory storing instructions that, when executed by the processor, configure the apparatus to:
detect a face of a person using an image capturing sensor;
extract facial features from the detected face using a facial feature extraction unit, wherein the facial feature extraction unit includes logic to identify local facial features and global facial features;
send the facial features to an American Sign Language (ASL) user ID unit, wherein the ASL user ID unit includes logic to identify an ASL user based on the facial features, the logic including:
on condition the ASL user is identified:
extract linguistic markers from the extracted facial features; and
send the extracted linguistic markers to an ASL emotion ID unit; and
on condition the ASL user is not identified:
search for a new face to detect;
identify an ASL emotion using the ASL emotion ID unit, wherein the ASL emotion ID unit includes logic to identify the ASL emotion associated with the extracted linguistic markers by comparing the extracted linguistic markers to curated linguistic markers in an ASL emotions database, wherein the ASL emotions database includes emotions associated with the curated linguistic markers,
and
configure a user interface to display the ASL emotion associated with the extracted linguistic markers.

10. The computing apparatus of claim 9, wherein the image capturing sensor includes at least one of a camera, a smartphone, a tablet, and combinations thereof.

11. The computing apparatus of claim 9, wherein the facial features include at least one of local facial features, global facial features, and combinations thereof.

12. The computing apparatus of claim 11, wherein the local facial features include at least one of a mouth, eyebrows, an eye, eyes, raised eyebrows, a slight head tilt, a furrowed brow, and combinations thereof.

13. The computing apparatus of claim 11, wherein the global facial features include at least one of a sad expression, a happy expression, an angry expression, and combinations thereof.

14. The computing apparatus of claim 9, wherein the linguistic markers include at least one of effortlessly, regularly, normal and proper, recently, carelessly, inattentively, much greater than expected, a great deal, a large amount, smoothly, very thin, quickly, easily, and combinations thereof.

* * * * *